United States Patent [19]

Decher et al.

[11] 4,034,604

[45] July 12, 1977

[54] APPARATUS FOR DETERMINING CHARACTERISTICS OF TURBO-POWERED AIRPLANE ENGINE SIMULATORS

[75] Inventors: Reiner Decher, Bellevue; Eugene Howard Fromm, Seattle; David Charles Tegeler, Renton, all of Wash.

[73] Assignee: The Boeing Company, Seattle, Wash.

[21] Appl. No.: 617,619

[22] Filed: Sept. 29, 1975

[51] Int. Cl.² ...................... G01M 9/00; G01L 5/13
[52] U.S. Cl. ................................ 73/147; 73/117.4
[58] Field of Search .............. 73/116, 117.1, 117.4, 73/147, 432 SD; 244/53 R

[56] References Cited

U.S. PATENT DOCUMENTS

| | | | |
|---|---|---|---|
| 3,015,231 | 1/1962 | Ganahl | 73/116 |
| 3,097,536 | 7/1963 | Young | 73/141 R X |
| 3,449,947 | 6/1969 | Ormond | 73/117.4 |

*Primary Examiner*—Charles A. Ruehl
*Assistant Examiner*—John S. Appleman
*Attorney, Agent, or Firm*—Glenn Orlob; Bernard A. Donahue

[57] ABSTRACT

This invention relates to apparatus for accurately determining the characteristics of turbo-powered simulators. The apparatus provides for the determination of the air flow through the turbine of the simulator, the air flow through the fan section, and the thrust produced, all with high accuracy. The data thus accumulated, together with the data on temperatures and pressures both inside and outside the simulated engine, enable the engineer to determine other desired characteristics. The apparatus is free of certain disadvantages of conventional equipment in that it substantially eliminates tare forces in thrust measurement, it eliminates the necessity of accounting for inlet momentum, it minimizes distortion of inlet flow, and it enables simple and accurate measurement of the air flow through the engine simulator.

5 Claims, 6 Drawing Figures

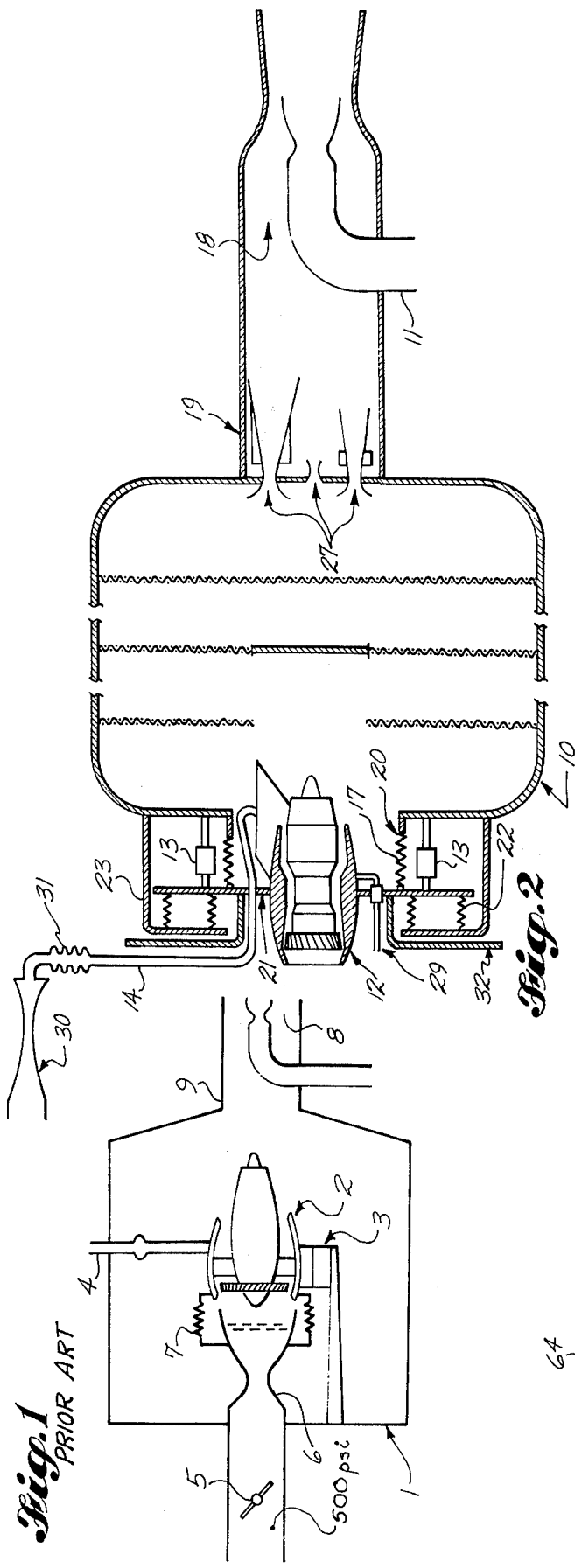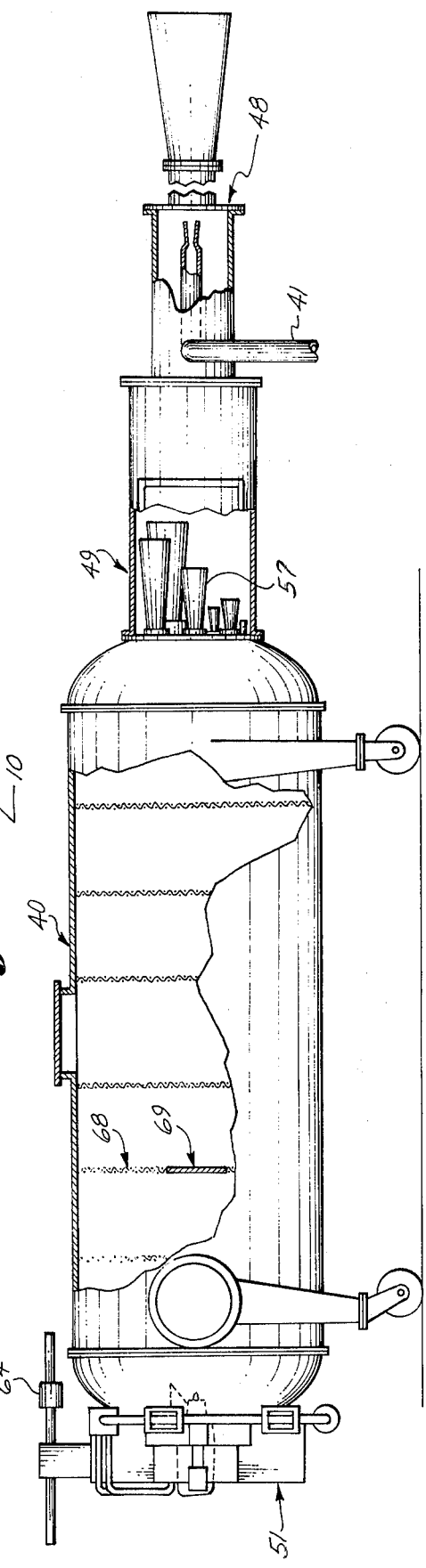

APPARATUS FOR DETERMINING CHARACTERISTICS OF TURBO-POWERED AIRPLANE ENGINE SIMULATORS

BACKGROUND OF THE INVENTION

In recent years, the wind tunnel testing of airplane models has involved the increasing use of turbopowered simulators to simulate the fan-jet engines commonly utilized on actual airplanes. These turbopowered simulators are of the general type shown in the Kutney and Erwin U.S. Pat. No. 3,434,679. They may be generally described as miniature fan-jet engines, with the outstanding difference that they contain no "hot core" or gas producing section, but rather, are equipped with a turbine, powered by an external source of compressed air, which turbine drives the fan. Such simulators give the closest known practical model equivalent of real engines on a real airplane.

It is evident, however, that the accuracy of the prediction of full-scale operation on a real airplane depends upon the accuracy to which the characteristics of the simulator are known. Accuracy of prediction is not only highly desirable from an engineering standpoint, but from an economic view as well, for the reason that performance of airplanes is often guaranteed on the basis of model testing.

DESCRIPTION OF THE DRAWINGS

FIG. 1 is a diagrammatic illustration of prior art apparatus utilized for ascertaining characteristics of turbinepowered simulators.

FIG. 2 is a diagrammatic illustration of the apparatus of the present invention.

FIG. 3 is a side view, partly in section, of actual apparatus incorporating the principles of this invention.

DESCRIPTION OF THE INVENTION

Figure 4:
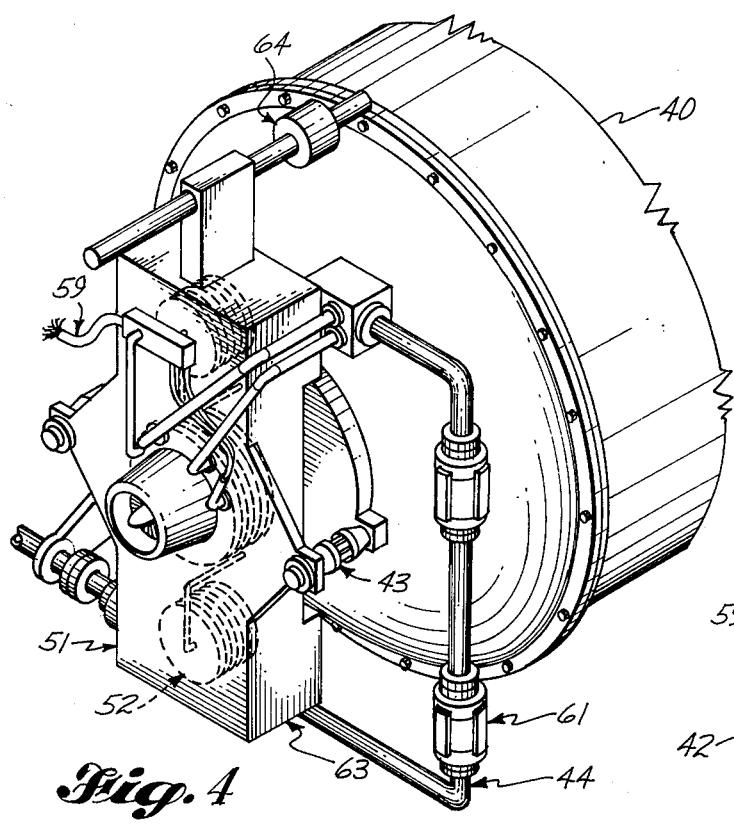
FIG. 4 is a perspective of the inlet end of the apparatus of FIG. 3.

This invention can be best understood by a brief consideration of prior apparatus, such as shown diagrammatically in FIG. 1. This apparatus consists of a tank 1 within which the engine simulator 2 is mounted upon a force-measuring balance 3. Compressed air to drive the turbine is supplied by conduit 4 from a suitable source. Fan air is supplied through a throttle 5 and a flow-limiting nozzle 6 to the face of the engine simulator, a flexible seal 7 being provided between the nozzle 6 and the simulator 2. Air is exhausted from the tank by an ejector 8 in the outflow passage 9. Forces are measured by the balance 3.

It is apparent that the air from nozzle 6 approaches the simulator with appreciable velocity and that the momentum of the approaching air exerts a force upon the balance, which momentum must be accounted for in the reduction of data obtained. Furthermore, it is difficult to avoid velocity variations across the air stream (i.e., flow distortions) and such variations lead to inaccuracies. It will be apparent also that the flexible seal 7 and the pressures to which it is subjected also impose forces upon the force-measuring balances. The air flow through the apparatus is determined at the inlet, by the nozzle 5 and suitable flow-measuring apparatus in the turbine air supply.

The apparatus of the present invention is diagrammatically shown in FIG. 2. The equipment comprises a large chamber 10 having at opposite ends an entrance 20 and an exhaust 19. Air is drawn into the chamber through the entrance 20 by an ejector 18 in the exhaust passage 19, supplied with compressed air through pipe 11 from a suitable source. Interposed in the exhaust passage 19 between the chamber 10 and the ejector 18 is a group of venturis 27 of known configuration, each of which has known flow limiting and controlling characteristics. Thus the mass flow through the exhaust passage is accurately determined by the number and size of the several venturis 27, which are preselected to regulate the mass flow to the desired value.

The turbopowered simulator 12 is mounted at the inlet 20 of the chamber on structure, about to be described, so that flow into the chamber 10 through the entrance 20 passes through the engine simulator 12. The mounting structure includes an apertured plate 21 supported from the chamber 10 by force-measuring balances 13, in the example shown, two in number. These balances are of known configuration, and are connected electrically to suitable known equipment, so as to indicate the forces applied to them. The force of principal interest is longitudinal, that is, parallel to the principal air flow, commonly referred to as thrust. A flow shield 32 is attached to plate 21 to ensure that all forces due to the inlet flow field are accounted for in the force balance measurement.

Sealing the apertured plate 21 to the entrance 20 of the chamber 10 is a flexible bellows 17. To compensate for differential pressure effects tending to expand or contract the bellows 17, two other bellows 22, having an aggregate effective area equal to that of bellows 17 are mounted between the plate 21 and the chamber 10, with their interiors connected to the interior of the chamber, by conduits not shown, so that the net effect of the pressure difference between the interior and the exterior of the chamber is zero. More specifically, in the diagrammatic showing of FIG. 2, the bellows 22 are attached at one end to the forward face of plate 21 and at their other ends to structure 23 rigid with the chamber 10.

The engine simulator 12 is mounted upon the plate 21 within the aperture therein by any suitable attaching and sealing means. Air for driving the turbine of the simulator is supplied, from a suitable source, through a flow controlling venturi 30 and thence through flexible connectors 31 and duct 14 to the engine simulator. The flexible connectors are of known design and allow high pressure air to be supplied to the simulator without imposing forces upon the force-measuring balances 13. Instrumentation within the simulator, primarily sensing temperatures and pressures, and lubricating oil supply, are connected to outside equipment by flexible lines indicated at 29.

In operation the entire apparatus is normally within a room of sufficient volume to constitute a large plenum chamber, so that the surrounding air is essentially static. Thus no correction need be made for the momentum of the air approaching the simulator, nor are there any appreciable flow velocity distortions. The effect of the bellows 17 and the compensating bellows 22 substantially eliminates tare forces imposed upon the balances 13. Thus the balances 13 measure the true thrust force developed by the simulator. Accurate determination of the mass flows involved are obviously of prime importance. The flow through venturi 30 to power the simulator is readily and accurately ascertained by known characteristics of the venturi. Similarly, the flow through the venturi group 27 at the exit is easily and accurately determined by the known characteristics of these venturis. It is apparent, of course, that the mass flow through the fan section of the simulator is the difference between the total flow exiting the apparatus as determined by venturi group 27 and that supplied the simulator, as determined by venturi 30.

The features just described with reference to the diagrammatic showing of FIG. 2 are incorporated in the exemplary embodiment of FIG. 3 through FIG. 6. In this configuration, the chamber 40 is a tank, of suitable large volume, for example, about four feet in diameter and twelve feet in length, mounted upon suitable supports such as casters or wheels. At the exit (right, as shown) is an exhaust passage 49 communicating with an ejector 48, which is supplied with compressed air from a suitable source through supply duct 41. In the exit end wall of chamber 40 is a group of venturis 57. Each venturi is of known flow characteristics, and thus by varying the number and size of the several venturis, any predetermined mass flow can be achieved.

Spaced along the length of chamber are a number of screens 68 to smooth the flow of air so that the accuracy of the flow as measured by venturis 57 is maintained. To this end also, one of the screens is provided with a centrally located impervious plate 69 upon which the flow into the chamber 40 impinges.

Figure 5:
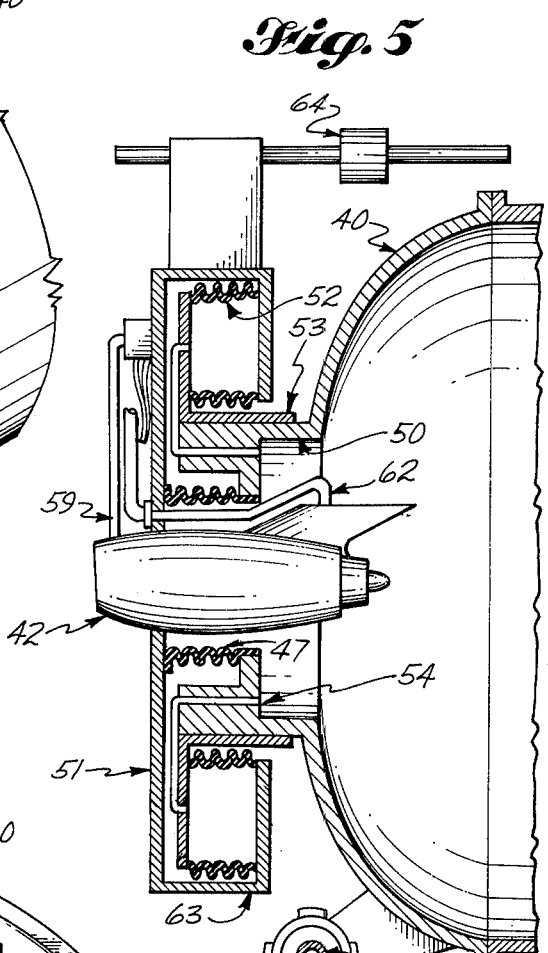
FIG. 5 is a vertical section through the inlet end portion of the apparatus of FIG. 3, taken on line 5-5 of FIG. 6.
Figure 6:
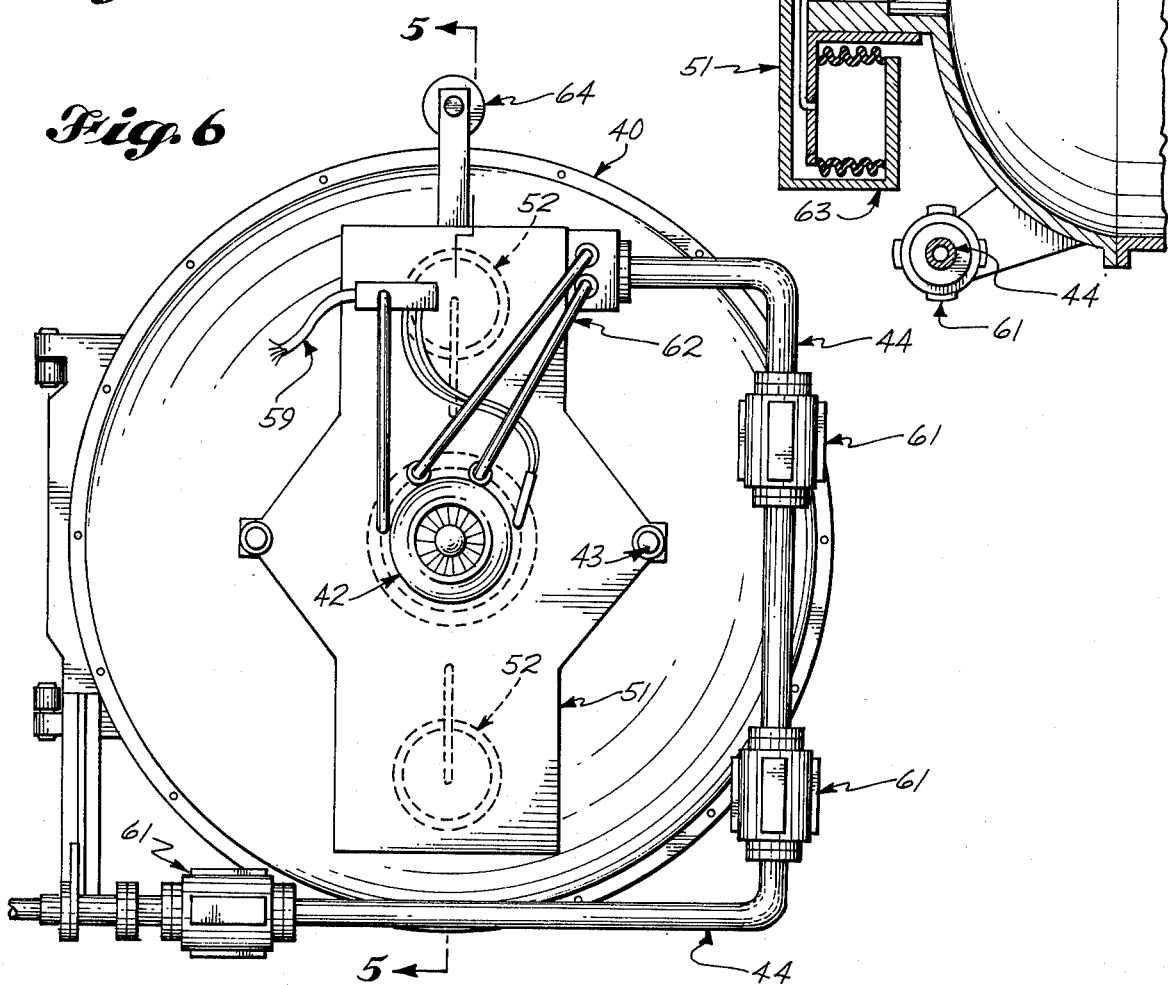
FIG. 6 is an end view of the apparatus of FIG. 3.

The details of the entrance end of the apparatus are best shown in FIGS. 4, 5 and 6. Here the simulator-supporting plate 51 is essentially rectangular, with laterally extending portions attached to the outer ends of balances 43, the inner (right, as shown) ends of which are attached to the end wall of chamber 40. Thus the balances, of known configurations, not only support the plate 51 and associated equipment (about to be described) but indicate forces applied thereto. A balancing weight 64 may be utilized to eliminate pitching moment forces on balances 43.

The plate 51 has attached thereto rearwardly extending walls 63, forming together therewith a box-like structure. Interposed between the plate 51 and the entrance 50 of chamber 40 is a flexible bellows 47 which seals the plate 51 to the chamber 40, while permitting the limited motion required by the balances 43. Compensating bellows 52 (two in this example) are interposed between the rearwardly extending walls 63 and a flanged collar 53 surrounding and attached to the entrance member 50. These compensating bellows 52 are connected to the interior of chamber 40 by passages 54, and are of effective aggregate area equal to the effective area of central bellows 47. Thus, any pressure difference between the interior and exterior of chamber creates no force upon the balances 43.

The turbopowered simulator 42 is supported in any convenient fashion on the plate 51 within the aperture thereof. High pressure air is supplied through a flow limiting venturi (not shown) to pipes 44 and flexible joints 61, and thence to simulator 42 through connecting tubes 62. Instrumentation within the simulator, and lubricating oil therefore, are connected to outside indicating equipment, and oil source, respectively, through flexible leads 59.

The equipment just described has demonstrated in actual operation thrust and air flow measurements of very substantially higher accuracy than previously obtainable. This improvement stems primarily from three factors. First, the balancing bellow arrangement permits thrust measurement with negligible tare forces. Second, the elimination of the need for measuring and accounting for inlet momentum removes an important source of uncertainty. Typically, in prior equipment, the forces of inlet momentum are of the same order of magnitude as the thrust produced by the propulsive unit. Third, the use of choked venturis in the exit makes possible a high order of accuracy of air flow determination.

While for ordinary wind tunnel applications, the air in the room in which this equipment operates is at normal atmospheric pressure and ordinary temperatures, it is apparent that temperature, pressure and humidity of the room air may, if desired, be controlled, and if necessary, the exhaust of the apparatus conducted to the atmosphere outside the room. Furthermore, although the invention has been described as applied to the calibration of turbine powered simulators, the principles thereof are applicable to testing of full-scale, real engines.

We claim as our invention:

1. Flight simulation apparatus comprising: a chamber having an inlet passage and an exhaust passage;
    means for causing movement of air through said exhaust passage;
    means in said exhaust passage for controlling air flow through said passage to a predetermined amount;
    an apertured plate outside of said chamber adjacent said inlet passage;
    flexible sealing means connecting said plate to said inlet passage;
    compensating expansible chamber means attached to said chamber and to said plate, said compensating expansible chamber means being responsive to the difference in pressure between the interior and the exterior of said chamber; and force measuring balance means interposed between said chamber and said plate.

2. The apparatus of claim 1, further including:
    duct means incorporating a flow-controlling venturi, adapted to supply a predetermined flow of air from an external source to a model attached to said plate.

3. Apparatus as claimed in claim 1 wherein the means in said exhaust passage for controlling air flow is one or more venturis.

4. The apparatus of claim 1 wherein the compensating expansible chamber means are bellows, the interiors of which are exposed to pressure within said chamber.

5. Structure for mounting a propulsive unit for air flow therethrough into a chamber, comprising:
    a chamber having an opening;
    a member having an aperture substantially coaxial with said opening;
    flexible sealing means secured to said chamber and to said apertured member and defining a passage therebetween;
    compensating expansible chamber means communicating with said chamber operatively connected to said chamber and said member; and
    force sensitive balance means attached to said chamber and said apertured member.

* * * * *